(12) United States Patent
Agarwal et al.

(10) Patent No.: US 8,325,615 B2
(45) Date of Patent: Dec. 4, 2012

(54) SYSTEM AND METHOD FOR COLLAPSED SUBSCRIBER MANAGEMENT AND CALL CONTROL

(75) Inventors: Kaitki Agarwal, Westford, MA (US); Matthew H. Harper, Salem, NH (US)

(73) Assignee: Cisco Technology, Inc., San Jose, CA (US)

( * ) Notice: Subject to any disclaimer, the term of this patent is extended or adjusted under 35 U.S.C. 154(b) by 466 days.

(21) Appl. No.: 11/517,883

(22) Filed: Sep. 8, 2006

(65) Prior Publication Data

US 2008/0062985 A1    Mar. 13, 2008

(51) Int. Cl.
*G01R 31/08* (2006.01)
(52) U.S. Cl. ........................................ 370/252; 370/352
(58) Field of Classification Search .................. 370/252, 370/329, 353, 392
See application file for complete search history.

(56) References Cited

U.S. PATENT DOCUMENTS

| | | | | |
|---|---|---|---|---|
| 7,688,764 B2* | 3/2010 | Dorenbosch et al. | ......... | 370/260 |
| 2002/0075844 A1* | 6/2002 | Hagen | ........................... | 370/351 |
| 2006/0146786 A1* | 7/2006 | Lian et al. | ..................... | 370/352 |
| 2008/0043770 A1* | 2/2008 | Arnoff et al. | ................. | 370/429 |

FOREIGN PATENT DOCUMENTS

JP    2005354423 A    12/2005

OTHER PUBLICATIONS

Rosenberg et al. "RFC 3261 SIP: Session Initiation Protocol", Jun. 2002, IETF.*
International Search Report and Written Opinion issued for corresponding International Patent Application No. PCT/US2007/019645.

* cited by examiner

*Primary Examiner* — Jung Park
(74) *Attorney, Agent, or Firm* — Wilmer Cutler Pickering Hale and Dorr LLP

(57) ABSTRACT

Systems and methods for integrating subscriber management and call control functionalities in a packet data network are provided. Subscriber management services include things such as tracking usage for billing, providing account information, and authorization of resources to a subscriber or user. Call control functionality includes setting up Session Initiation Protocol (SIP) call sessions for the exchange of data. SIP functionality is provided by a SIP server and subscriber management is provided by a Network Access Server (NAS), where the SIP functionality and NAS functionality are implemented on the same device. The combined device can maintain at least one database that maps information between the functionalities, so both functionalities may access or be alerted to the other's information.

24 Claims, 7 Drawing Sheets

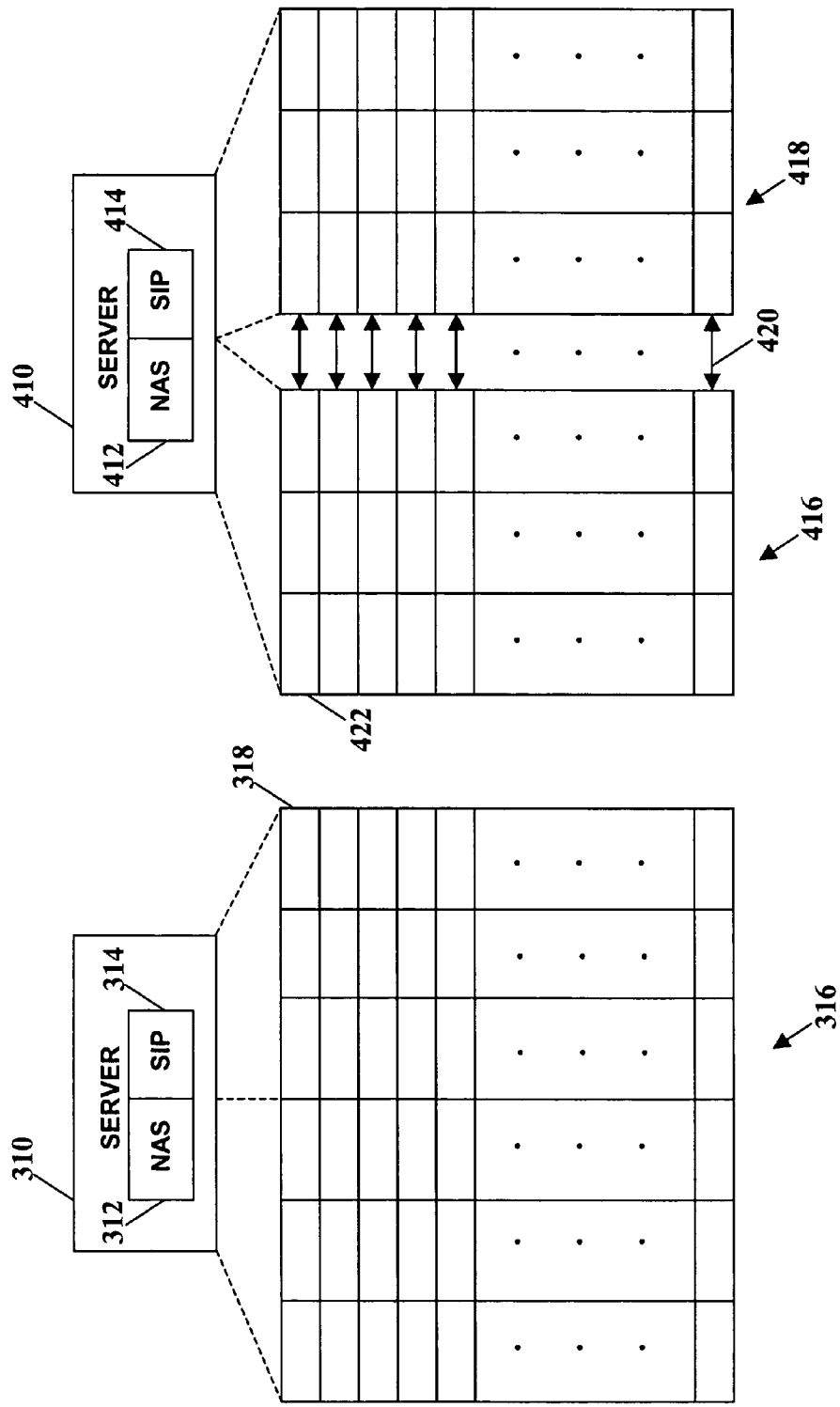

SYSTEM AND METHOD FOR COLLAPSED SUBSCRIBER MANAGEMENT AND CALL CONTROL

BACKGROUND OF THE INVENTION

The present invention relates to integrating subscriber management and call control functionalities in a packet data network. More particularly, the present invention relates to integrating the functionality of a network access server and a call session server in a wireless packet data communication system.

Wireless communication systems and networks are used in connection with many applications, including, for example, satellite communications systems, WiFi access systems, cellular communication systems, and with user equipment such as portable digital assistants (PDAs), laptop computers, Treos, Blackberries, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile subscriber. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

In a wireless communication system, the system typically includes a wired portion and a wireless portion, with the wireless portion being between the user equipment and an antenna. The antenna usually connects to devices that convert data on the wires to radio signals, other devices that route data to one or more antennas, and/or devices that provide data content to the user equipment such as web pages, email, music, or video. When certain types of multimedia content are desired by user equipment, session initiation protocol (SIP) is used to setup a user session. SIP user sessions support multimedia content such as video, voice, instant messaging, presence, online games, and virtual reality. Typically, SIP is handled by a SIP proxy server, which initiates, modifies, and terminates these user sessions. These SIP proxy servers are separate from network access servers (NAS) that provide subscriber management services. Given the independent nature of the SIP proxy servers and network access servers on a communication network, security problems can arise in the communication between these independent devices and problems can occur with the allocation of network resources.

SUMMARY OF THE INVENTION

Systems and methods for integrating subscriber management and call control functionalities in a packet data network are provided. Subscriber management services are provided by a Network Access Server (NAS) and include things such as tracking usage for billing, providing account information, and authorization of resources to a subscriber or user. Call control functionality includes setting up Session Initiation Protocol (SIP) call sessions for the exchange of data and can be provided by a SIP server. A combined device can maintain at least one database, which may be virtual, that maps information between the functionalities, so both functionalities may access or be alerted to the other's information. This combined device provides benefits such as bandwidth management, enhanced security, and enhanced reporting.

In accordance with the present invention, certain embodiments feature an apparatus providing integrated subscriber management and call control functionalities comprising a server, a Network Access Server (NAS) functionality, a Session Initiation Protocol (SIP) functionality, and at least one database. The server includes at least one computer readable medium. The Network Access Server (NAS) functionality resides within the server. The Session Initiation Protocol (SIP) functionality resides within the server, and the at least one database in the at least one computer readable medium stores information from the NAS functionality and the SIP functionality, wherein the NAS functionality information is mapped to the SIP functionality information in the at least one database.

Further in accordance with the present invention, certain embodiments feature a process for providing an integrated subscriber management and call control functionality comprising processing data in a Network Access Server (NAS) functionality, detecting a Session Initiation Protocol (SIP) call session for a subscriber on a server where a NAS functionality and SIP functionality reside, finding access side NAS information related to the SIP call session, and mapping the SIP call session information to the NAS information.

Still further in accordance with the present invention, certain embodiments feature an apparatus providing integrated subscriber management and call control functionalities including a mechanism for providing a server including at least one computer readable medium, a mechanism for providing a Network Access Server (NAS) functionality residing within the mechanism for providing a server, a mechanism for providing a Session Initiation Protocol (SIP) functionality residing within the mechanism for providing a server, and at least one database in the at least one computer readable medium in which the mechanism for providing a NAS functionality and the mechanism for providing a SIP functionality store information, wherein NAS functionality information is mapped to SIP functionality information in the at least one database.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout, and in which:

FIG. 3, FIG. 4, and FIG. 5 are diagrams of a combined Network Access Server (NAS) and Session Initiation Protocol (SIP) server in accordance with certain embodiments of the present invention;

DETAILED DESCRIPTION OF THE INVENTION

In accordance with the present invention, systems and methods for integrating subscriber management and call control functionalities in a packet data network are provided. Subscriber management services include functions such as tracking usage for billing, providing account information, and authorization of resources to a subscriber or user. Call control functionality includes setting up sessions for the exchange of data, more particularly, establishing, maintaining, and tearing down Session Initiation Protocol (SIP) sessions. In certain embodiments of the invention, SIP functionality is provided by a SIP server and subscriber management is provided by a Network Access Server (NAS) functionality, and the SIP functionality and NAS functionality are implemented on the same device. The combined device can maintain a database that maps information between the functionalities, so both functionalities may access or be alerted to the other's information. As one practiced in the field would appreciate, many devices and different types of devices can be described in a network that are not included in this application for the sake of brevity.

Figure 1:
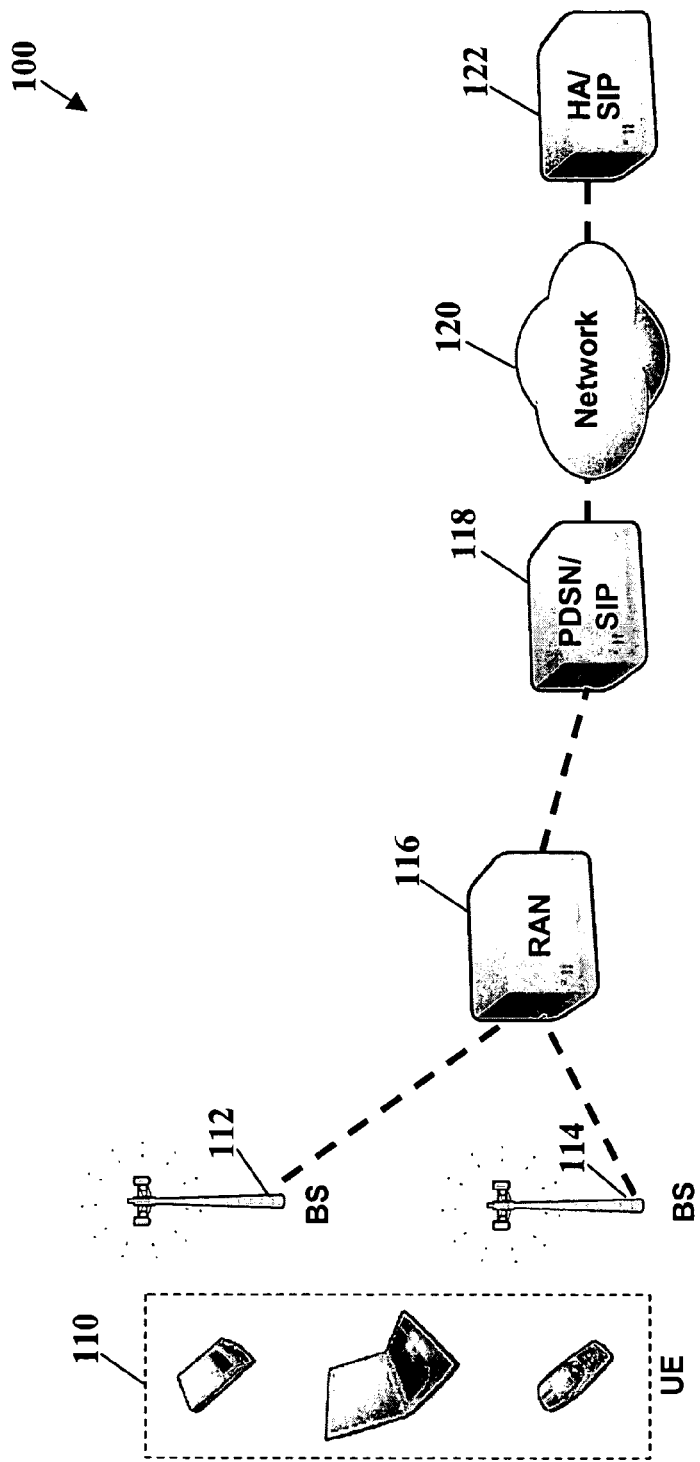
FIG. 1 and FIG. 2 are schematic diagrams of network topologies used for packet data transmissions in accordance with certain embodiments of the present invention.

FIG. 1 is a schematic diagram of a network topology 100 including combined SIP and NAS functionalities in accordance with certain embodiments of the invention. Network topology 100 includes user equipment (UE) 110, base stations (BS) 112 and 114, a radio access network (RAN) 116, a packet data serving node (PDSN) with SIP functionality 118, a network 120, and a Home Agent (HA) with SIP functionality 122. User equipment 110 may include devices such as portable digital assistants (PDAs), laptop computers, Treos, Blackberries, cellular telephones, and any other device capable of receiving packet data transmissions. Base stations 112 and 114 include antennas that enable the delivery of radio transmissions to user equipment 110 and receive information and requests from user equipment 110. Information received by base station 112 and 114 from user equipment 110 is forwarded either wirelessly or by wired connection to its destination.

RAN 116 can include devices integrated within it such as a radio network controller (RNC) and a packet control function (PCF). Illustrated RAN 116 is coupled to base stations 112 and 114 and PDSN/SIP 118. In certain embodiments, one or both of base stations 112 and 114 may be included in RAN 116. The combined PDSN/SIP 118 can provide integrated functionality in 3G CDMA Networks. Network 120 is coupled to PDSN/SIP 118 and can include various network devices such as routers and other equipment. HA/SIP 122 is coupled to network 120, and can provide integrated functionality in a Mobile-IP network. The NAS devices of a PDSN and a Home Agent provide such services as tunneling/de-tunneling information, managing mobility of a roaming user equipment 110, authorization of a subscriber, and managing of billing information. The PDSN may further prepare packet data for radio transmission and the HA may further prepare packet data for IP network transmission. Integrated SIP/NAS devices 118 and 122 may be used together in the same network or used in separate networks depending on the protocols implemented on network 100. Integrated SIP/NAS devices 118 and 122 may map information forming at least one database from the SIP functionality and from the NAS functionality. This information can be mapped according to the same user equipment 110 and be used for filtering information relating to SIP sessions and NAS call information.

Figure 2:
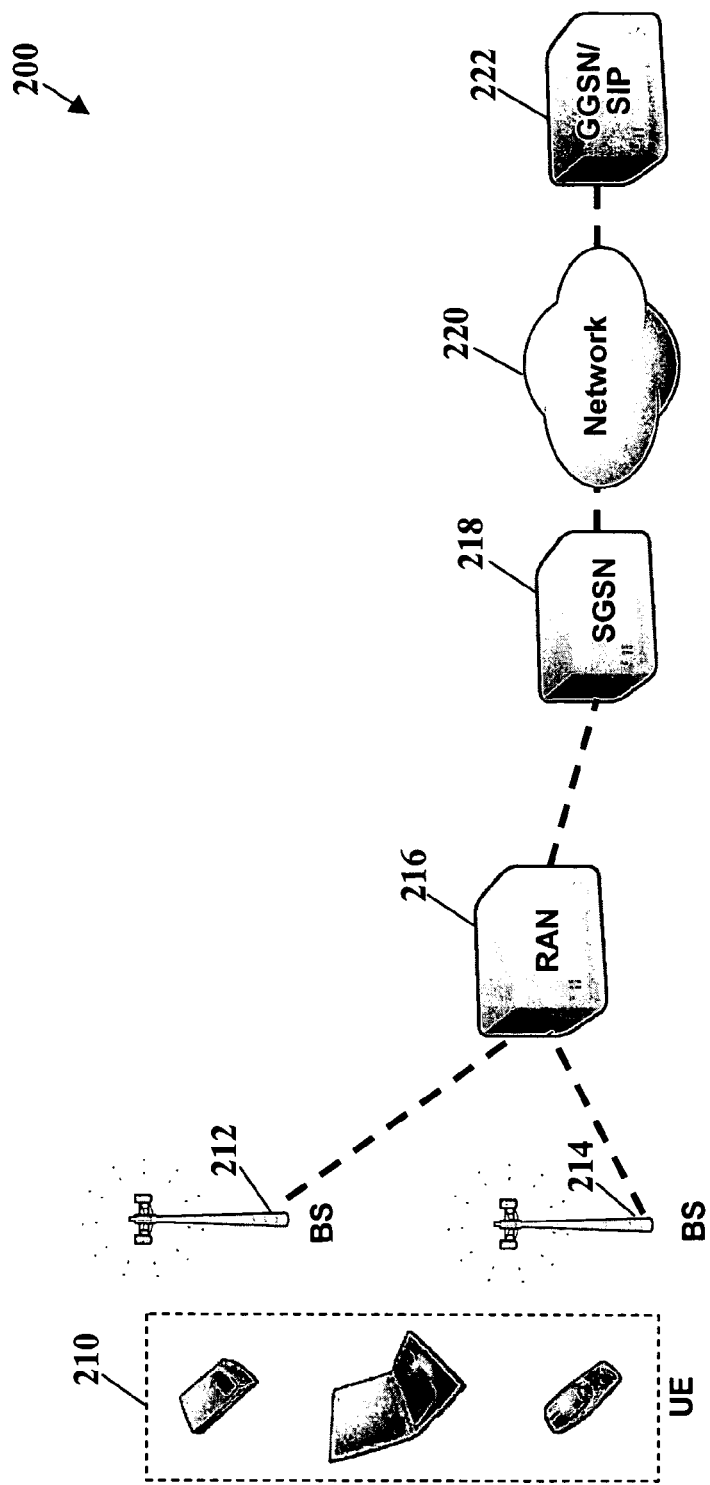

FIG. 2 is a schematic diagram of a network topology 200 including combined SIP and NAS functionalities in accordance with certain embodiments of the invention. Network topology 200 includes user equipment (UE) 210, base stations (BS) 212 and 214, a radio access network (RAN) 216, a serving general packet radio service (GPRS) support node (SGSN) 218, a network 220, and a gateway general packet radio service (GPRS) support node (GGSN) with SIP functionality 222. User equipment 210, base stations 212 and 214, RAN 216, and network 220 function in a similar manner to user equipment 110, base stations 112 and 114, RAN 116, and network 120. Illustrated SGSN 218 may perform such functions such as tunneling/de-tunneling information, managing mobility of roaming user equipment 110, and managing billing information. The functions performed by SGSN 218 depend on whether the Global System for Mobile Communications (GSM) standard is used or if Universal Mobile Telecommunications System (UMTS) standard is used. GGSN/SIP 222 is similar to the functionality provided in HA/SIP 122 with Mobile IP, but GGSN/SIP 222 supports GPRS/UMTS network standards. Other networks and NAS devices that can be integrated with SIP functionality, but are not illustrated, include an Access Service Network (ASN) Gateway used in 802.16e (Mobile WiMax) standard, a Layer Two Tunneling Protocol (L2TP) Network Server used in the L2TP standard, a Secure Internet Protocol (IPSec) Tunnel Terminator used in the IPSec standard, and a WiFi Access Point or a WiFi Switch used in the 802.11 standard. As one practiced in the field would appreciate, these other networks and NAS devices can be implemented through the ideas described below.

The above-mentioned NAS devices when integrated with SIP functionality may include SIP device functionality such as that provided by a SIP proxy, a Back-to-Back User Agent (B2BUA), and/or a Session Boarder Controller (SBC). These three SIP devices are deployed for use in call-control with Voice over IP (VoIP) and multimedia session setup. A SIP proxy provides SIP routing capabilities and can also provide integrated policy decision and enforcement function for managing resource reservation used in providing end-to-end Quality of Service (QoS). A B2BUA can additionally modify SIP signaling passing through it, for example, modifying Session Description Protocol (SDP) included in SIP messages. A B2BUA can also provide topology hiding by replacing the contact with the B2BUA's service address, generating a new Call-ID for the outbound call, and creating new tags in the From and To headers. A SBC is a SIP proxy/B2BUA that can modify SIP signaling passing through it as well as any corresponding bearer traffic. The SBC may be used to enforce polices between networks and to permit traffic to cross Network Address Translation(NAT)/firewall boundaries. The SIP device may be implemented according to RFC 3261, which can be found at http://rfc.net/rfc-index.html, and is incorporated by reference herein in its entirety. The SIP device, in some embodiments, encompasses functionality provided by a proxy-call session control function (P-CSCF) as described by the 3rd Generation Partnership Project (3GPP) and 3GPP2.

FIG. 3 is an illustration of an implementation of an integrated NAS/SIP server in accordance with certain embodiments of the present invention. Server 310 may be any CPU based system that is in communication with other devices, and in some embodiments may be Starent Networks' ST-16 platform or a similar platform. NAS 312 and SIP 314 reside on server 310 and can be implemented in software or in a combination of software and hardware. Illustrated NAS 312 and SIP 314 can provide the functionalities described above such as subscriber management and call control. A database 316 resides on server 310 and is implemented on a computer readable medium. A number of processes may be running on server 310 while server 310 is providing NAS 312 and SIP 314 service to the network. NAS 312 and SIP 314 may deposit or retrieve information relating to one or more of these processes. Database 316 stores a process in a row such as process 318. Database 316 may be implemented as a single database including information for both NAS 312 and SIP 314. NAS 312 and SIP 314 may both access information deposited by the other and use this information in conjunction with process 318.

FIG. 4 is an illustration of another implementation of an integrated NAS/SIP in accordance with certain embodiments of the present invention. Server 410, NAS 412, and SIP 414 are implemented in a similar manner to server 310, NAS 312, and SIP 314. However, database 316 is split into two databases: a NAS database 416 and a SIP database 418. Illustrated NAS database 416 is bi-directionally mapped 420 to SIP database 418. In certain embodiments, NAS database 416 and SIP database 418 include a bi-directional mapping from an access call state handle to a SIP call state handle. Information that may be stored in one or more of the databases includes subscriber information such as a phone number, a username, a connection time, an idle time, a session time, prepaid billing information, security parameters, billing information/policies, a mobile node location, and RAN information (e.g., airlink state, location, sector, bandwidth currently in use). As one practiced in the field would appreciate, the information stored in one or more of the databases used by NAS 412 and SIP 414 can include information the NAS previously stored or received about a subscriber and information the SIP proxy learned about the subscriber. The learning may come from signaling or from a policy server response after the SIP call was provisioned.

The bi-directional mapping allows the databases to function in an integrated fashion with information shared between NAS 412 and SIP 414. A process 422 is a row in database 416 that is mapped bi-directionally to a row in database 418. NAS 412 and SIP 414 may both access information deposited by the other and use this information while servicing process 422. In some embodiments, the database is virtual and created by bi-directionally linking 420 a NAS access call state record 416 to a SIP call state record 418. NAS access call state record 416 and SIP call state record 418 may be the records that log information typically used by NAS 412 and SIP 414.

Figure 5:
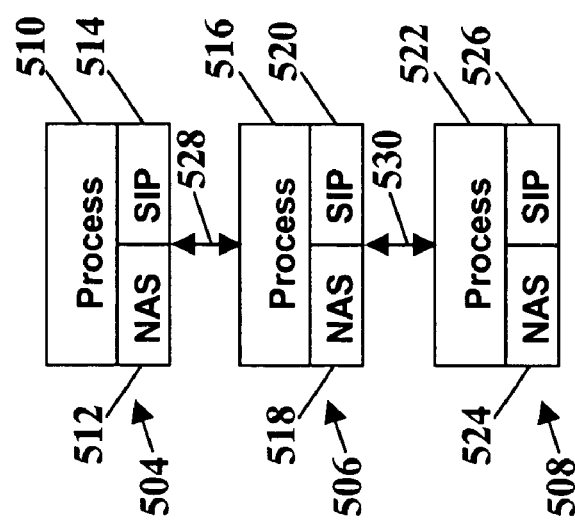

FIG. 5 is an illustration of yet another implementation of an integrated NAS/SIP in accordance with certain embodiments of the present invention. As shown, modules 504, 506, and 508 are further subdivided. Module 504 includes a process 510, NAS 512, and SIP 514. Modules 506 and 508 similarly include process 516, NAS 518, and SIP 520 or process 522, NAS 524, and SIP 526. Each module is bi-directionally linked or mapped to at least one other module. Module 504 is mapped by link 528 to module 506 and module 506 is mapped by link 530 to module 508. Links 528 and 530 may be implemented in software, for example, through a pointer or a memory reference. A data structure or an object in software may form module 504, module 506, and module 508. The module may use function calls or instantiate other objects to provide NAS functionality and SIP functionality during the process. A module is created when a process begins. For example, when user equipment turns on and registers with the network. NAS 512 can handle this request and certain data requests such as a downloading email from a server. SIP 514 may be involved when the user equipment initiates a session to begin a VoIP call, to send presence information, or to begin a multi-user gaming session. Process 510 can include other functionalities such as Deep Packet Inspection Billing, Virus scanning, Firewall protection, and traffic policing/optimization/scheduling. Process 510, process 516, and process 522 are instances of software that handle requests from user equipment in some embodiments of the invention. Process 510 may also assign or distribute tasks to components such as NAS 512 and SIP 514. The linking of the modules can create a database which may be queried to obtain information.

Figure 6:
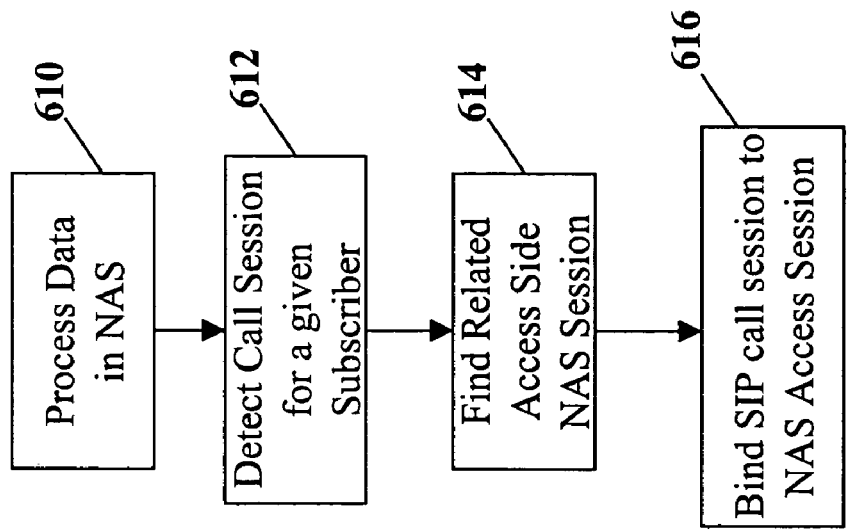
FIG. 6 is a flow diagram of a method for integrating subscriber management and call control functionalities in accordance with certain embodiments of the present invention.

FIG. 6 is a flow diagram of a method for integrating subscriber management and call control functionalities in accordance with certain embodiments of the present invention. The process begins at step 610 when data from user equipment is being processed in the NAS. The processing may include packet filtering, tunneling of data, packet inspection, data encryption, and billing information. At step 612, a call session is detected from processing data for a given subscriber. The call session can be the detection of SIP signaling by a subscriber. In step 614, the related access side information is found in the NAS. In some embodiments, the software is already linked due to the structure of the software, in which case the "finding" is a validation or confirmation step. At step 616, the information from the NAS and SIP are linked or mapped together. The linking or mapping may occur in a database or a virtual database including modules or linked call state records in memory.

Figure 7:
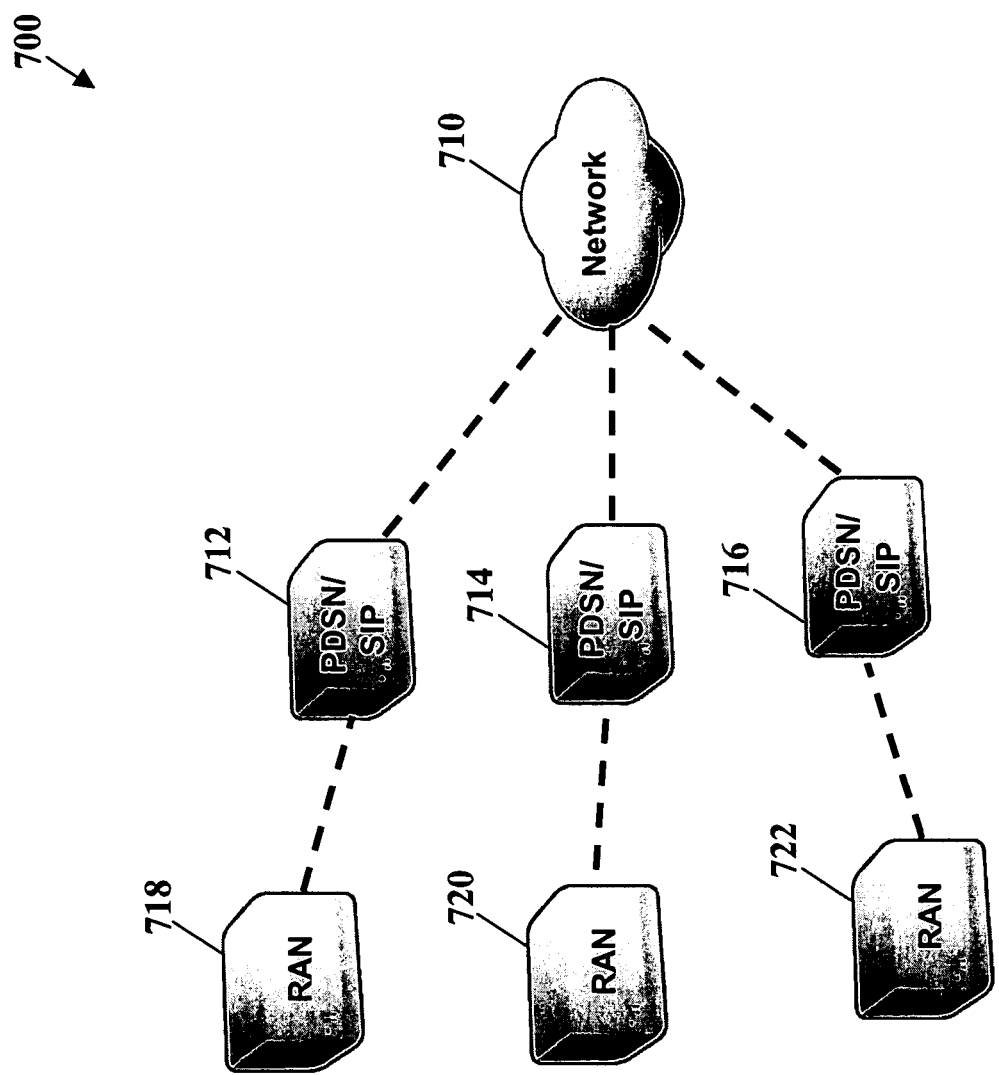
FIG. 7 is a schematic diagram of multiple combined NAS and SIP devices in a network in accordance with certain embodiments of the present invention.

FIG. 7 is a schematic diagram of a network topology 700 with multiple integrated NAS and SIP devices in a network in accordance with certain embodiments of the present invention. Network topology 700 includes a network 710, PDSNs with SIP functionality 712, 714, and 716, and RANs 718, 720 and 722. The separate PDSNs with SIP functionality shown as 712, 714, and 716 may each maintain a database for NAS and SIP information. Because each piece of user equipment may be uniquely identified, the database may be distributed or centralized without overlap.

Figure 8:
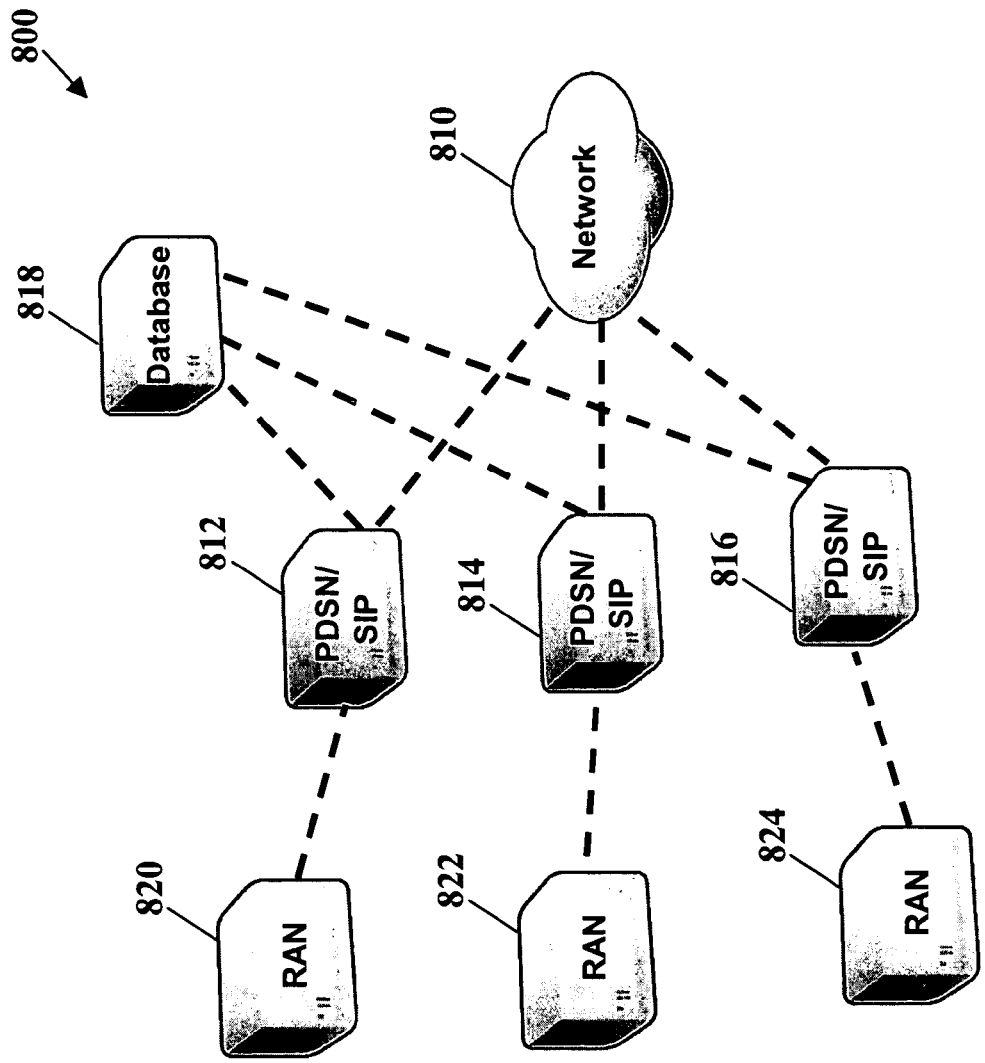
FIG. 8 is a schematic diagram of multiple combined NAS and SIP devices with an external database in accordance with certain embodiments of the present invention.

FIG. 8 illustrates a network topology 800 with a centralized database in accordance with certain embodiments of the invention. Network topology 800 includes a network 810, PDSNs with SIP functionality 812, 814, and 816, a database 818, and RANs 818, 820 and 822. Database 818 may be implemented on a server separate from a PDSN with SIP functionality or may be implemented on another PDSN with SIP functionality. The database can query the PDSN/SIP devices 812, 814, and 816 for updates and change the database to reflect changes. Alternatively, PDSN/SIP devices 812, 814, and 816 can send updates to database 818. These updates may be event based, such as when a change occurs, or time based, such as sent every second. PDSN/SIP devices may query database 818 for information on the linked SIP functions.

Figure 9:
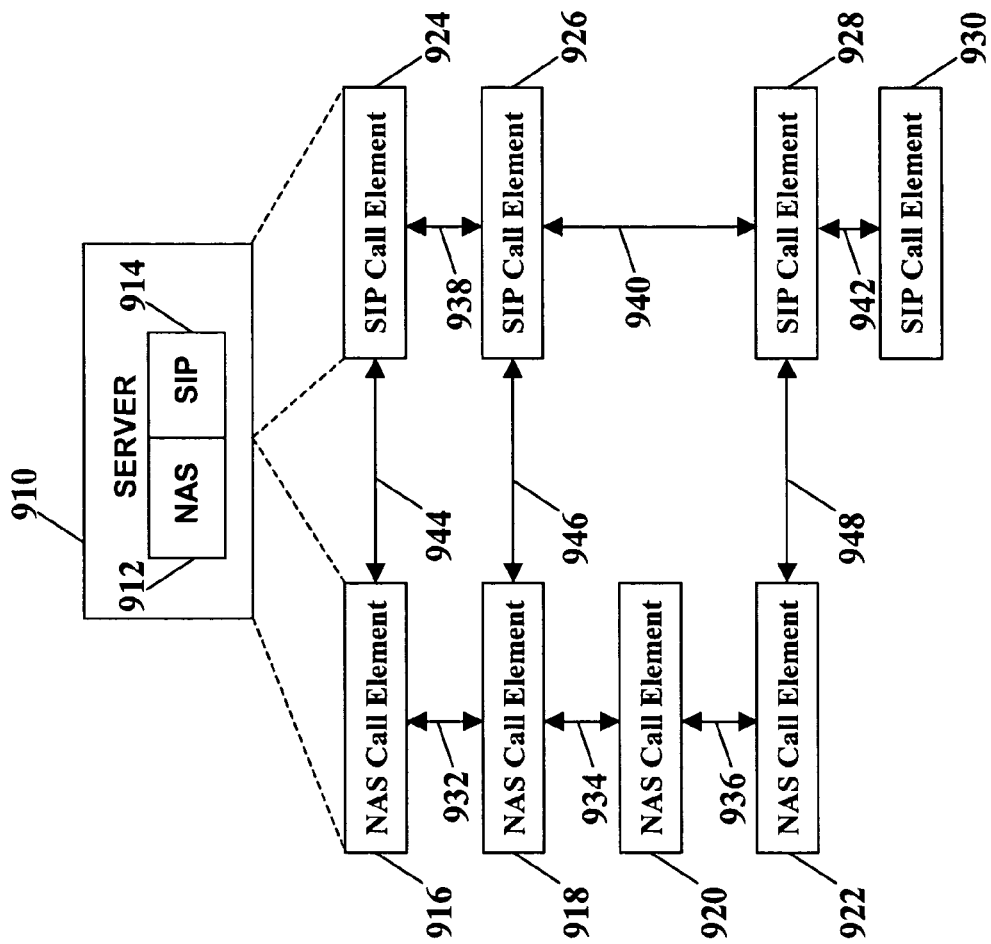
FIG. 9 is a diagram of a combined NAS and SIP server with linked call elements in accordance with certain embodiments of the present invention.

FIG. 9 is an illustration of an implementation of an integrated NAS/SIP server in accordance with certain embodiments of the present invention. Server 910, NAS 912, and SIP 914 are implemented in a similar manner to server 310, NAS 312, and SIP 314. In certain embodiments, the NAS call elements and SIP call elements form a virtual database. A virtual database can be implemented with NAS call elements 916, 918, 920, and 922 that store NAS call record information and SIP call elements 924, 926, 928, and 930 that store SIP call record information. Pointers 932, 934, and 936 link NAS call elements 916, 918, 920, and 922. Pointers 938, 940, and 942 link SIP call elements 924, 926, 928, and 930. As shown, a NAS call element may bind with a related SIP call element. Bi-directional link or mapping 944 binds NAS call element 916 to SIP call element 924. Bi-directional link 946 binds NAS call element 918 to SIP call element 926 and bi-directional link 948 binds NAS call element 922 to SIP call element 928. Illustrated NAS call element 920 is not bound to a SIP call element because no SIP call element exists at this time. If a SIP signaling requesting a SIP session is detected, a SIP call element can be created. After a SIP call element is created, server 910 can bind the newly created SIP call element to NAS call element 920. Illustrated SIP Call Element 930 exists without being bound to a NAS Call Element.

In some embodiments, integrating a NAS with a SIP function supporting a SIP proxy/Back-to-Back User Agent (B2BUA) can manage bandwidth usage. The SIP proxy/B2BUA can compute the potential bandwidth usage by examining the codecs and requested QoS present in Session Description Protocol (SDP) offers and answers. The integrated NAS/SIP device can reject new session setup and updates of existing sessions that demand more bandwidth than is available from the bandwidth calculations. Thus, existing sessions are allowed to maintain desired QoS levels.

In certain embodiments, an integrated NAS/SIP device can reduce the amount of stranded network resources such as SIP memory when user equipment drops or de-registers. Typically, when user equipment drops or is otherwise disconnected, the corresponding SIP session is not deregistered until after a protocol timer expires. This delay ties up network resources that could otherwise be redeployed. An integrated NAS/SIP device can also prevent the network from trying to send a call to a subscriber that is still registered, but whose session is no longer available at the NAS. This may occur in non-integrated devices because the protocol timer did not expire yet. In some embodiments, the integrated NAS/SIP device allows the SIP function to reject a SIP invite without contacting the mobile node because the SIP function knows there are insufficient resources available to communicate with the mobile node from the NAS function. The NAS knows the status of a subscriber and when the SIP function is integrated with NAS the SIP function can deregister a session without having to wait for a timer to trigger the expiration of a session. In some embodiments, the integration allows sharing of information across otherwise disparate devices.

Additionally, recovery of a failed integrated NAS/SIP device is coherent because both the NAS functionality and the SIP functionality fail at the same time. When separate NAS and SIP servers are used, data inconsistencies can exist during fault conditions, which complicate recovery management. In some embodiments, NAS and SIP information from the integrated NAS/SIP device is mirrored onto another server and this server can be activated using the same network identification as the server being replaced. The mirrored server may backup the original server in part or all of the NAS and SIP functionality. The original server can send update messages to the mirror server when events occur, or periodically. The mirror server can also service active user equipment using NAS and/or SIP functions.

In some embodiments, with an integrated NAS/SIP device, loss of media can be detected and network resources can be redeployed or freed up. The NAS function can detect media inactivity and inform the SIP function so the SIP can issue a message to end the session and free up the resources. The media inactivity may occur when one endpoint disconnects the call, but the disconnect message is lost or the endpoint crashes without issuing a disconnect message. Additionally, the SIP function can provide information to the NAS function from source and destination information in the session description protocol (SDP) obtained during multimedia call setup for sending media. The NAS function can use this information to optimize Real-Time Transport Protocol (RTP) path routing.

In other embodiments, with an integrated NAS/SIP device, redundant security processing can be eliminated and call setup times can be reduced. For example, when a SIP function is integrated with a home agent using Mobile-IP and IPSec, an encrypted tunnel connection to a SIP server is no longer needed because the SIP function is integrated with the home agent. This saves the time required to establish an IPSec tunnel and eliminates the overhead of an additional IPSec payload within the tunneled MIP data. The integrated NAS/SIP device also eliminates insecure communications between independent NAS and SIP servers.

In some embodiments, with an integrated NAS/SIP device, management information about subscriber activity across multiple levels (e.g., access on one level and SIP services on another) can be displayed and/or reported together. This includes consolidation of accounting records for access services and SIP services.

In certain embodiments, when an integrated NAS/SIP device is further combined with a policy decision function, messaging required for QoS authorization between the NAS, policy decision function, and SIP function can be reduced. This can improve call setup time and reduce or eliminate the need to consume airlink resources for re-registration. The NAS can indicate the status of user equipment to a SIP application which periodically pings or requests re-registration from a user endpoint and the SIP function can take action based on the information it has access to on behalf of the user equipment so the message need not be answered by the user equipment.

In some embodiments, software needed for implementing a process includes a high level procedural or an object-orientated language such as C, C++, C#, Java, or Perl. The software may also be implemented in assembly language if desired. The links or mapping may be implemented by pointers, memory references, or any other applicable method. The database or virtual database may be created by a number of different data structures such as arrays, linked-lists, trees, associative arrays, stacks, and queues. In certain embodiments, the software is stored on a storage medium or device such as read-only memory (ROM), programmable-read-only memory (PROM), or magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. An apparatus providing integrated subscriber management and call control functionalities comprising:
   a server including at least one computer readable medium;
   a Network Access Server (NAS) functionality residing within the server;
   a Session Initiation Protocol (SIP) functionality residing within the server; and
   at least one database in the at least one computer readable medium in which the NAS functionality and the SIP functionality store information, wherein the NAS functionality information is mapped to the SIP functionality information in the at least one database allowing sharing of information between the NAS functionality and the SIP functionality to provide integrated subscriber management and call control.

2. The apparatus of claim 1, further comprising the SIP functionality computing potential bandwidth usage of a SIP call session and the NAS functionality rejecting call sessions that demand more bandwidth than is available.

3. The apparatus of claim 1, wherein the at least one database is created by a module that includes the NAS functionality and the SIP functionality.

4. The apparatus of claim 1, further comprising a CPU that detects SIP signaling and bi-directionally maps an access call state handle to a SIP call state handle in the at least one database to permit sharing of NAS information and SIP information between the SIP functionality and the NAS functionality.

5. The apparatus of claim 1, wherein the SIP functionality frees resources based on information from the at least one database.

6. The apparatus of claim 1, wherein the SIP functionality is a SIP proxy and the at least one database is a virtual database.

7. The apparatus of claim 1, wherein the NAS functionality is a home agent implementing Mobile-IP.

8. A method for providing an integrated subscriber management and call control functionality comprising:
processing data in a Network Access Server (NAS) functionality;
detecting a Session Initiation Protocol (SIP) call session for a subscriber on a server where a NAS functionality and SIP functionality reside;
finding access side NAS information related to the SIP call session;
mapping the SIP call session information to the NAS information; and
sharing information between the NAS functionality and the SIP functionality through the mapping to provide integrated subscriber management and call control.

9. The method of claim 8, wherein mapping occurs in at least one database.

10. The method of claim 8, further comprising creating a module that includes a NAS functionality and a SIP functionality.

11. The method of claim 8, further comprising:
computing potential bandwidth usage of the SIP call session; and
rejecting call sessions that demand more bandwidth than is available.

12. The method of claim 8, further comprising implementing the SIP functionality as a SIP proxy.

13. The method of claim 8, further comprising freeing the network resources when a user equipment drop is detected.

14. The method of claim 8, further comprising establishing an IP Security protocol (IPSec) tunnel to both the NAS functionality and the SIP functionality.

15. An apparatus providing integrated subscriber management and call control functionalities comprising:
a means for providing a server including at least one computer readable medium;
a means for providing a Network Access Server (NAS) functionality residing within the means for providing a server;
a means for providing a Session Initiation Protocol (SIP) functionality residing within the means for providing a server; and
at least one database in the at least one computer readable medium in which the means for providing a NAS functionality and the means for providing a SIP functionality store information, wherein the NAS functionality information is mapped to the SIP functionality information in the at least one database allowing sharing of information between the means for providing a NAS functionality and the means for providing a SIP functionality to provide integrated subscriber management and call control.

16. The apparatus of claim 15, further comprising the means for providing a SIP functionality computing potential bandwidth usage of a SIP call session and the means for providing a NAS functionality rejecting call sessions that demand more bandwidth than is available.

17. The apparatus of claim 15, wherein the at least one database is created by module that includes the means for providing a NAS functionality and the means for providing a SIP functionality.

18. The apparatus of claim 15, further comprising a CPU that detects SIP signaling and bi-directionally maps the means for providing a SIP functionality to the means for providing a NAS functionality.

19. The apparatus of claim 15, wherein the means for providing a SIP functionality frees resources based on information from the at least one database.

20. The apparatus of claim 15, wherein the means for providing a SIP functionality is a SIP proxy.

21. A system for use in a packet data network comprising:
a subscriber management server for managing subscribers including tracking usage, maintaining account information, and authorizing resources to a subscriber;
a session initiation protocol (SIP) call control functionality server for establishing, maintaining, and tearing down SIP sessions and maintaining information about SIP sessions;
memory configured to store SIP information and including a mapping between the subscriber management server and the call control functionality server to allow the subscriber management server to access and process information associated with the call control functionality server and the call control functionality server to access and process information associated with the subscriber management server to control communications with a subscriber.

22. The apparatus of claim 21, further comprising the SIP call control functionality server computing potential bandwidth usage of a SIP call session, and the subscriber management server rejecting call sessions that demand more bandwidth than is available.

23. The apparatus of claim 21, wherein the SIP call control functionality server accesses subscriber management server information to determine the registration status of a subscriber, the SIP call control functionality server deregistering a session prior to expiration of a deregistration timer.

24. The apparatus of claim 21, SIP call control functionality server accesses subscriber management server information to determine available resources with the subscriber without having to obtain resource information from the subscriber, thereby allowing the SIP call control functionality server to reject a SIP invitation from a subscriber.

* * * * *